(12) United States Patent
Tsai

(10) Patent No.: US 9,565,811 B2
(45) Date of Patent: Feb. 14, 2017

(54) EXTERNAL CULTIVATION LIQUID SIPHON

(71) Applicant: Han-Yi Tsai, Taipei (TW)

(72) Inventor: Han-Yi Tsai, Taipei (TW)

(*) Notice: Subject to any disclaimer, the term of this patent is extended or adjusted under 35 U.S.C. 154(b) by 164 days.

(21) Appl. No.: 14/519,665

(22) Filed: Oct. 21, 2014

(65) Prior Publication Data

US 2015/0289459 A1 Oct. 15, 2015

(30) Foreign Application Priority Data

Apr. 10, 2014 (TW) .............................. 103113307 A

(51) Int. Cl.
  *A01G 27/00* (2006.01)
  *F04F 10/00* (2006.01)

(52) U.S. Cl.
  CPC ........... *A01G 27/005* (2013.01); *A01G 27/003* (2013.01); *F04F 10/00* (2013.01)

(58) Field of Classification Search
  CPC .... A01G 27/00; A01G 27/001; A01G 27/003; A01G 27/005; A01G 27/006; A01G 27/008; A01G 27/02
  USPC .............................. 47/48.5, 79; 119/245, 459
  See application file for complete search history.

(56) References Cited

U.S. PATENT DOCUMENTS

| | | | | |
|---|---|---|---|---|
| 3,168,797 A | * | 2/1965 | Patassy | A01G 27/003 177/207 |
| 4,846,206 A | * | 7/1989 | Peterson | A01G 27/001 137/1 |
| 4,945,676 A | * | 8/1990 | Sick | A01G 31/00 47/48.5 |
| 9,295,204 B2 | * | 3/2016 | Nguyen | A01G 27/005 |

FOREIGN PATENT DOCUMENTS

| | | |
|---|---|---|
| TW | I388278 | 3/2013 |
| TW | M465006 | 11/2013 |
| TW | M473049 | 3/2014 |

* cited by examiner

*Primary Examiner* — Danielle Clerkley
(74) *Attorney, Agent, or Firm* — Muncy, Geissler, Olds & Lowe, P.C.

(57) ABSTRACT

An external cultivation liquid siphon includes a liquid delivery equipment located in a cultivation liquid storage tank to continuously pump cultivation liquid to a plant cultivation pot and an external siphon equipment to bridge the cultivation liquid storage tank and the plant cultivation pot. The external siphon equipment has a tubular facility with variations in tubular diameters to generate siphonage action to fill the tubular facility with flowing liquid. Thus the cultivation liquid pumped by the liquid delivery equipment to the plant cultivation pot can circulate reciprocally between an upper liquid level and a lower liquid level to cultivate plants.

19 Claims, 8 Drawing Sheets

EXTERNAL CULTIVATION LIQUID SIPHON

FIELD OF THE INVENTION

The present invention relates to an external cultivation liquid siphon and particularly to a cultivation liquid siphon that provides circulation of cultivation liquid without adding electronic control elements.

BACKGROUND OF THE INVENTION

Aquaponics system functions mainly based on a principle of creature interaction that is existing in the nature. It is an eco-system in which plants, fishes, bacteria or microbes are fundamental elements, and excrements of the fishes are transformed to nutrients of plants. In a broader sense aquaponics is an eco-culture or composite cultivation technique. In practice the system generally adopts an approach of nitrifying waste water of culture farming through bacteria to produce nutrients needed by growing of plants. The waste water is finally transformed to the nutrients needed by the plants and absorbed. The water also is purified in the process. Hence the entire aquaponics system is eventually a closed water circulation system. It provides the advantage of culture farming without the need of changing water and growing vegetables without the need of watering. Meanwhile, the aquaponics system also incorporates microbes activities, hence is an organic cultivation and culture technique, and can provide more natural and healthy foods to people.

A conventional aquaponics system 1 is designed in a concept as shown in FIG. 1. It mainly includes a bell siphon 11 which consists of a bell hood 111, an inner tube 112 and an external air tube 113. The bell hood 111 has a plurality of apertures 114. A cultivation liquid storage tank 12 is provided which has a liquid pumping device 13 located inside to continuously pump liquid to a plant cultivation pot 14. When the cultivation liquid enters the bell hood 111 through the apertures 114 and reaches an upper spot of the inner tube 112, namely the upper liquid level where a plurality of cultivated plants 15 can absorb the cultivation liquid, if the cultivation liquid flows out through the inner tube 112 at a sufficient amount to form a water film and make the pressure inside the bell hood 111 smaller than the external atmospheric pressure, the bell siphon 11 generates a siphonage action, and the external atmospheric pressure pushes the cultivation liquid to flow back to the cultivation liquid storage tank 12. When the cultivation liquid drops to a lower liquid level the external air enters the bell hood 111 via the external air tube 113 to break liquid column and stop the siphonage action, then the cultivation liquid stop flowing back. Therefore the liquid level in the plant cultivation pot 14 reaches the lower liquid level to allow the roots of the cultivated plants to breath with oxygen. At the same time, the liquid pumping device 13 continuously pumps the cultivation liquid until reaching the higher liquid level to achieve circulation of the cultivation liquid, thereby make cultivation of the plants possible.

However, all the present bell siphon 11 adopts the internally built approach and is embedded in the plant cultivation pot 14, and is prone to skewing and results in failure of generating siphonage action desired, or has the inlet of the cultivation liquid jammed by dirt, stones or external objects that prohibits external air from entering the siphon air chamber to break the liquid column This makes the siphonage action fails to stop the liquid pumping device 13 to pump the cultivation liquid to the plant cultivation pot 14 and maintain the siphonage action to allow flow back of the cultivation liquid to the cultivation liquid storage tank 12 to keep liquid balance as desired. Namely, the liquid level in the plant cultivation pot 14 cannot rise to the higher liquid level to allow the plants 15 to get the cultivation liquid, but merely maintain at the lower liquid level, thus fails to achieve the liquid level circulation effect. In addition, the bell siphon 11 also has the external air tube 113 as shown in FIG. 1 to aid entry of external air when the actual liquid level drops to the lower liquid level, but it still does not improve the problems of skewing of the bell siphon 11 installation angle and jamming of the external objects.

Taiwan Patent Nos. M473049, M465006 and I388278 disclose various complex mechanisms that use a timer to interrupt pumping of cultivation liquid. However, the aquaponics system basically aims to adopt the concept of natural circulation function with minimum electronic devices. The aforesaid prior techniques, although can partly fix the problem, actually contradict this concept.

SUMMARY OF THE INVENTION

The primary object of the present invention is to overcome the problem of the conventional bell siphon of installed in the plant cultivation pot that results in unable to generate stable siphonage action.

To achieve the foregoing object the present invention provides an external cultivation liquid siphon to bridge a plant cultivation pot and a cultivation liquid storage tank to provide reciprocal siphonage action. It includes a liquid delivery equipment and an external siphon equipment. The liquid delivery equipment includes a liquid pumping device located in the cultivation liquid storage tank and a liquid delivery pipe to bridge the liquid pumping device and the plant cultivation pot. The external siphon equipment defines an upper liquid level in the plant cultivation pot corresponding to a plant cultivation location and a lower liquid level away from the plant cultivation location. The external siphon equipment is coupled with a liquid input tube corresponding to the lower liquid level. The liquid input tube is connected to a inverse U-shaped tube corresponding to the upper liquid level via a first connection tube. The inverse U-shaped tube has another end connected to a liquid discharge tube of the cultivation liquid storage tank via a second connection tube to output the cultivation liquid. The liquid discharge tube and the second connection tube are bridged by an intermediate tube . The second connection tube has an inner diameter greater than the inner diameter of the intermediate tube. The liquid discharge tube also has an inner diameter greater than the inner diameter of the intermediate tube.

In one embodiment the liquid input tube in the plant cultivation pot is coupled with a siphon ancillary member which has an open end located at the lower liquid level and a closed end higher than the liquid input tube, and an installation space between the closed end and the open end. The installation space has a space between the liquid input tube and the closed end to be defined as a siphon air chamber.

In another embodiment the open end is coupled with an isolation member.

In yet another embodiment the liquid discharge tube has a bend section adjacent to the coupling location of the intermediate tube.

In yet another embodiment the first connection tube and the inverse U-shaped tube are formed by bending a same tube.

In yet another embodiment the liquid input tube, the first connection tube and the inverse U-shaped tube are formed by bending a same tube.

In yet another embodiment the liquid input tube, the first connection tube, the second connection tube and the inverse U-shaped tube are formed by bending a same tube.

In yet another embodiment the intermediate tube has a coupling section located in the second connection tube formed at a length smaller than another coupling section of the intermediate tube at the liquid discharge tube.

In yet another embodiment the intermediate tube has a coupling section located at the second connection tube with a siphon ancillary sloped surface formed at the upper end thereof.

In yet another embodiment the liquid input tube is coupled with an isolation member.

In yet another embodiment the inverse U-shaped tube has a horizontal section which also can be an arched section.

By means of the construction set forth above, compared with the conventional structure, the invention provides features as follows:

1. The external siphon equipment of the external cultivation liquid siphon is located outside the plant cultivation pot, hence can reduce the size of the plant cultivation pot occupied by the external siphon equipment. Through installed outside, the external siphon equipment also can avoid from being impacted during the plants are reaped that might otherwise affect generation of siphonage action. In addition, being positioned outside, malfunction of the external siphon equipment can be easily detected.

2. The inverse U-shaped tube, the second connection tube, the liquid discharge tube and the intermediate tube are formed at tubular dimensions related to each other and can be selected to generate siphonage action more efficiently.

3. The siphon ancillary member of the external siphon equipment can resolve the problem of unstoppable siphonage action caused by ineffective control of liquid discharged amount resulted from liquid delivery amount and siphonage action at the final period, and also ensure that air can enter to break the liquid column to stop siphonage action.

4. The liquid input tube or the open end of the siphon ancillary member can be coupled with the isolation member to block external objects or dirt or stones from entering so that the inlet is not jammed that might otherwise hinder entering of the external air in the siphon air chamber to break the liquid column.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
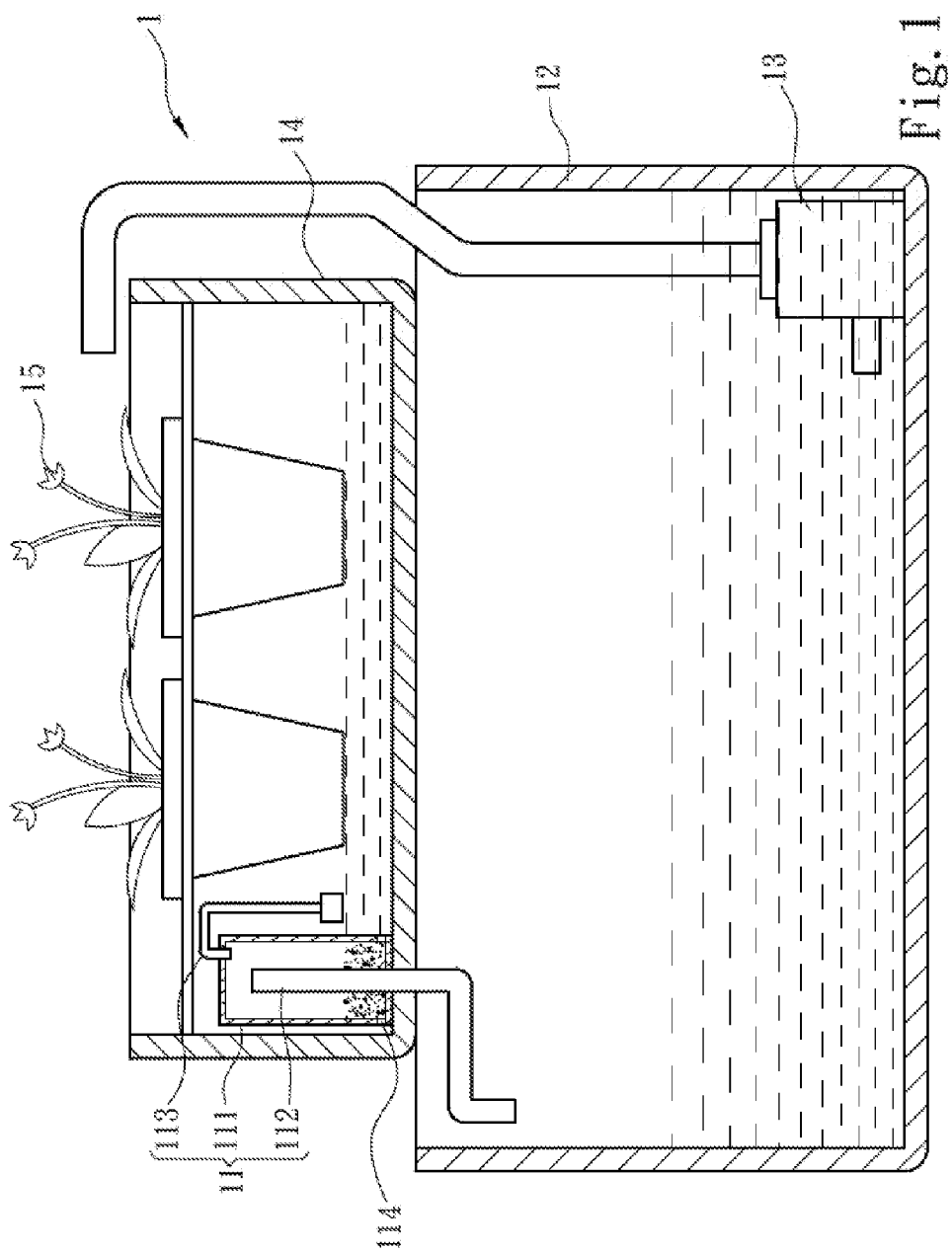
FIG. 1 is a schematic view of the structure of a conventional bell siphon.
Figure 2:
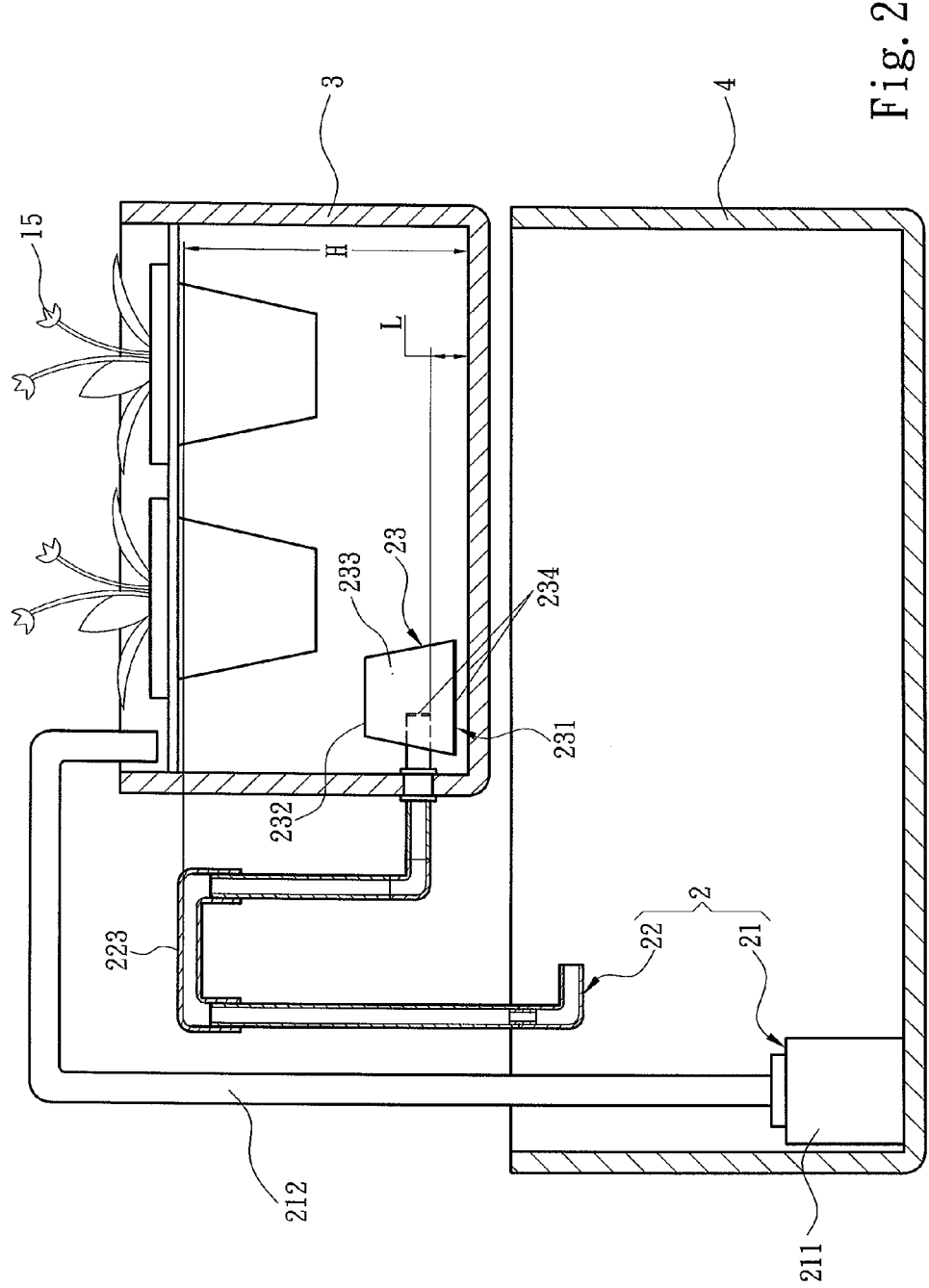
FIG. 2 is a schematic view of the structure of the external cultivation liquid siphon of the invention.
Figure 3:
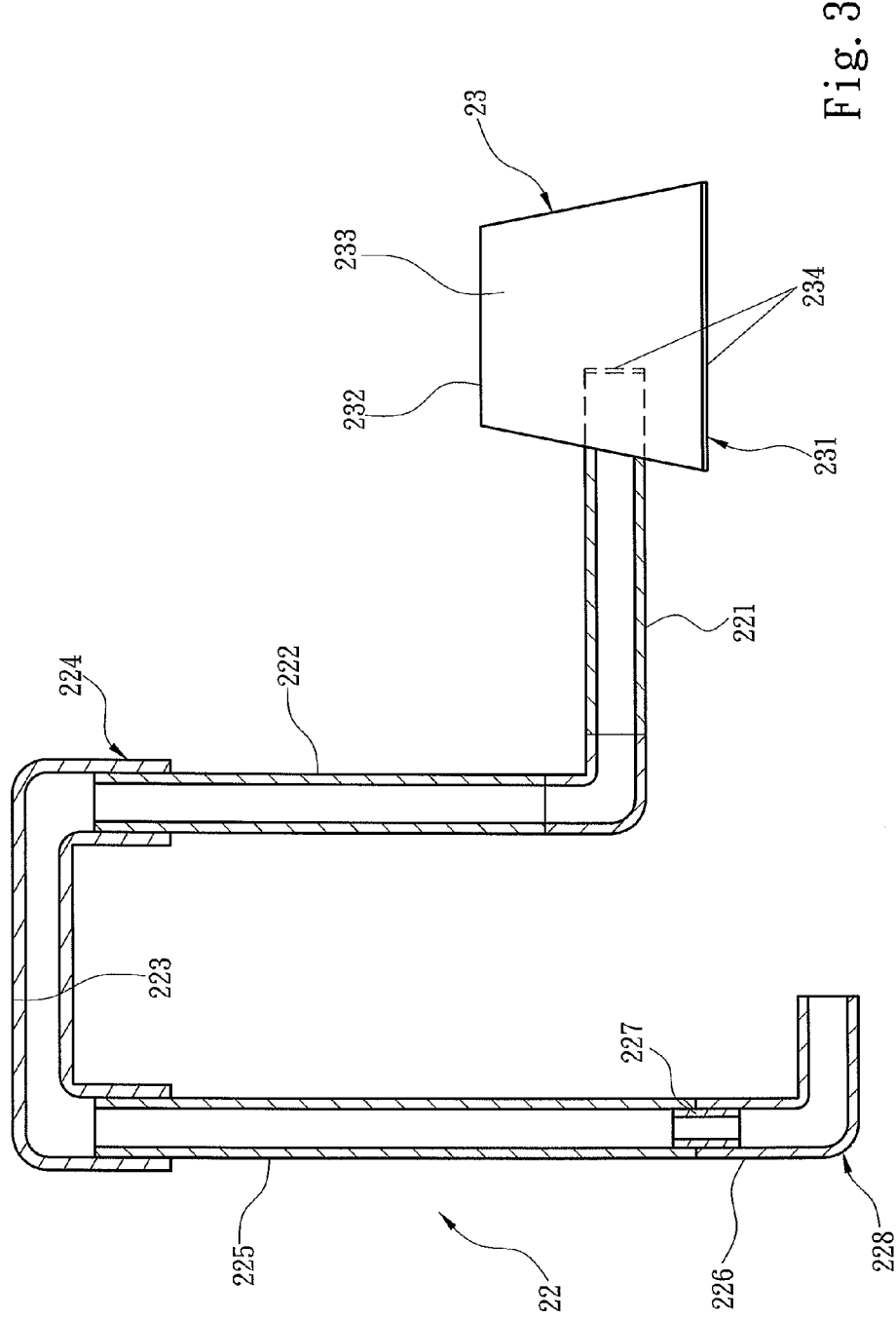
FIG. 3 is a schematic view of the structure of the external siphon equipment of the invention.
Figure 5:
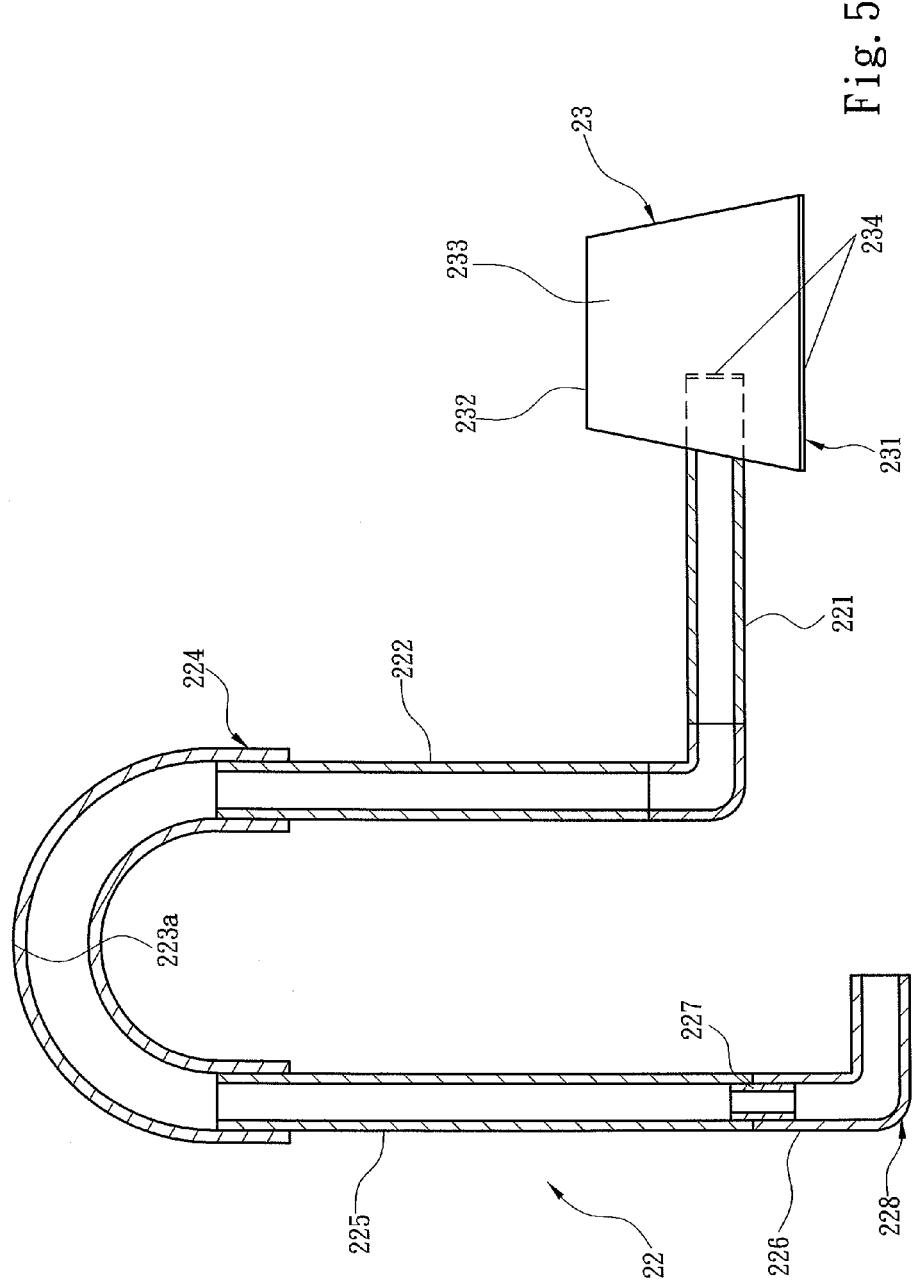
FIG. 5 is a schematic view of another structure of the external siphon equipment of the invention.

Please referring to FIGS. 2 and 3, the present invention aims to provide an external cultivation liquid siphon 2 mainly to bridge a plant cultivation pot 3 and a cultivation liquid storage tank 4 to provide reciprocal siphonage action that is applicable to an aquaponics system or for circulation of cultivation liquid in a hydroponics system. The external cultivation liquid siphon 2 includes a liquid delivery equipment 21 and an external siphon equipment 22. The liquid delivery equipment 21 includes a liquid pumping device 211 located in the cultivation liquid storage tank 4 and a liquid delivery pipe 212 to bridge the liquid pumping device 211 and the plant cultivation pot 3. The liquid pumping device 211 can be a submerged pump. The plant cultivation pot 3 and the external siphon equipment 22 are bridged by the external siphon equipment 22 which also defines an upper liquid level H corresponding to a plant cultivation location in the plant cultivation pot 3 and a lower liquid level L away from the plant cultivation location. The external siphon equipment 22 further is connected to a liquid input tube 221 corresponding to the lower liquid level L. The liquid input tube 221 has another end bent or connected to an elbow tube to connect to a first connection tube 222 which is further connected to a inverse U-shaped tube 224 corresponding to the upper liquid level H. The inverse U-shaped tube 224 has a horizontal section 223 which also can be an arched section 223a as shown in FIG. 5. The inverse U-shaped tube 224 has another end connected to a liquid discharge tube 226 via a second connection tube 225 to deliver the cultivation liquid to the cultivation liquid storage tank 4. The liquid discharge tube 226 and the second connection tube 225 are bridged by an intermediate tube 227 which has an inner diameter smaller than that of the second connection tube 225 and the liquid discharge tube 226. The second connection tube 225 and the liquid discharge tube 226 can be formed at a same tubular diameter. The first connection tube 222 and the inverse U-shaped tube 224 can also be formed by bending a same tube, or the liquid input tube 221, the first connection tube 222 and the inverse U-shaped tube 224 can also be formed by bending the same tube, or the liquid input tube 221, the first connection tube 222, the second connection tube 225 and the inverse U-shaped tube 224 can also be formed by bending the same tube.

Figure 4A:
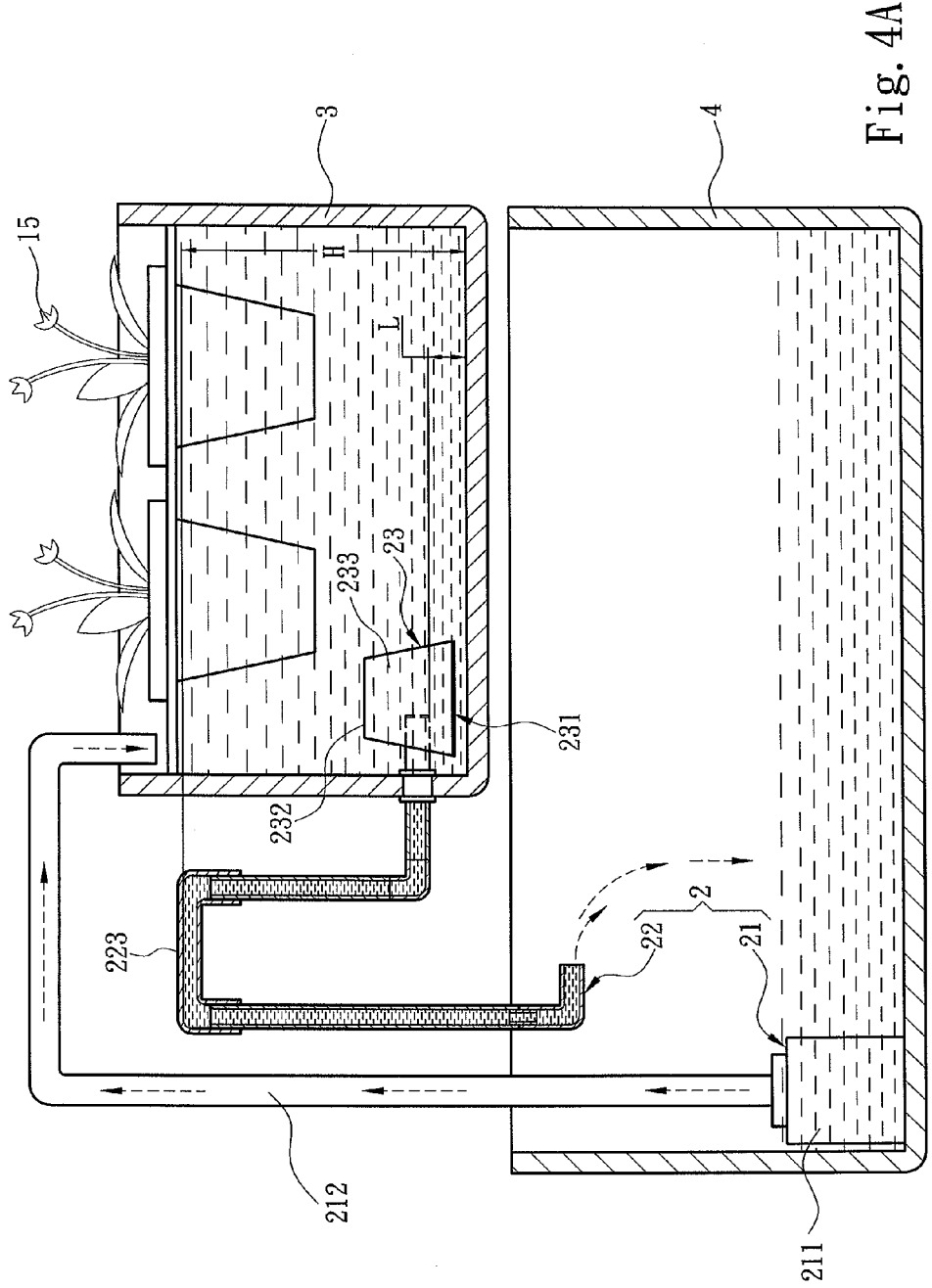
FIGS. 4A through 4C are schematic views of the external cultivation liquid siphon of the invention in siphonage actions to circulate cultivation liquid.
Figure 4B:
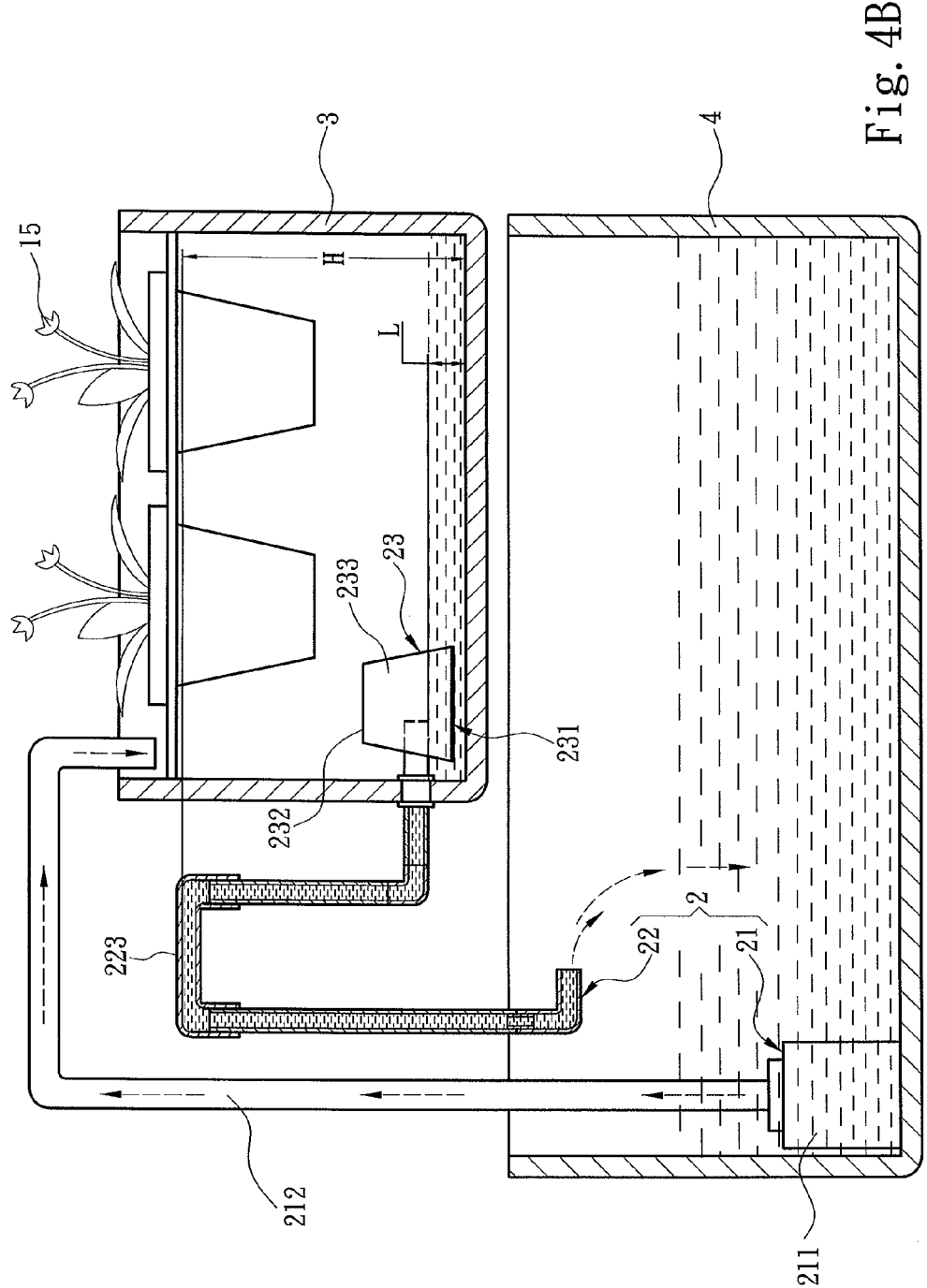
Figure 4C:
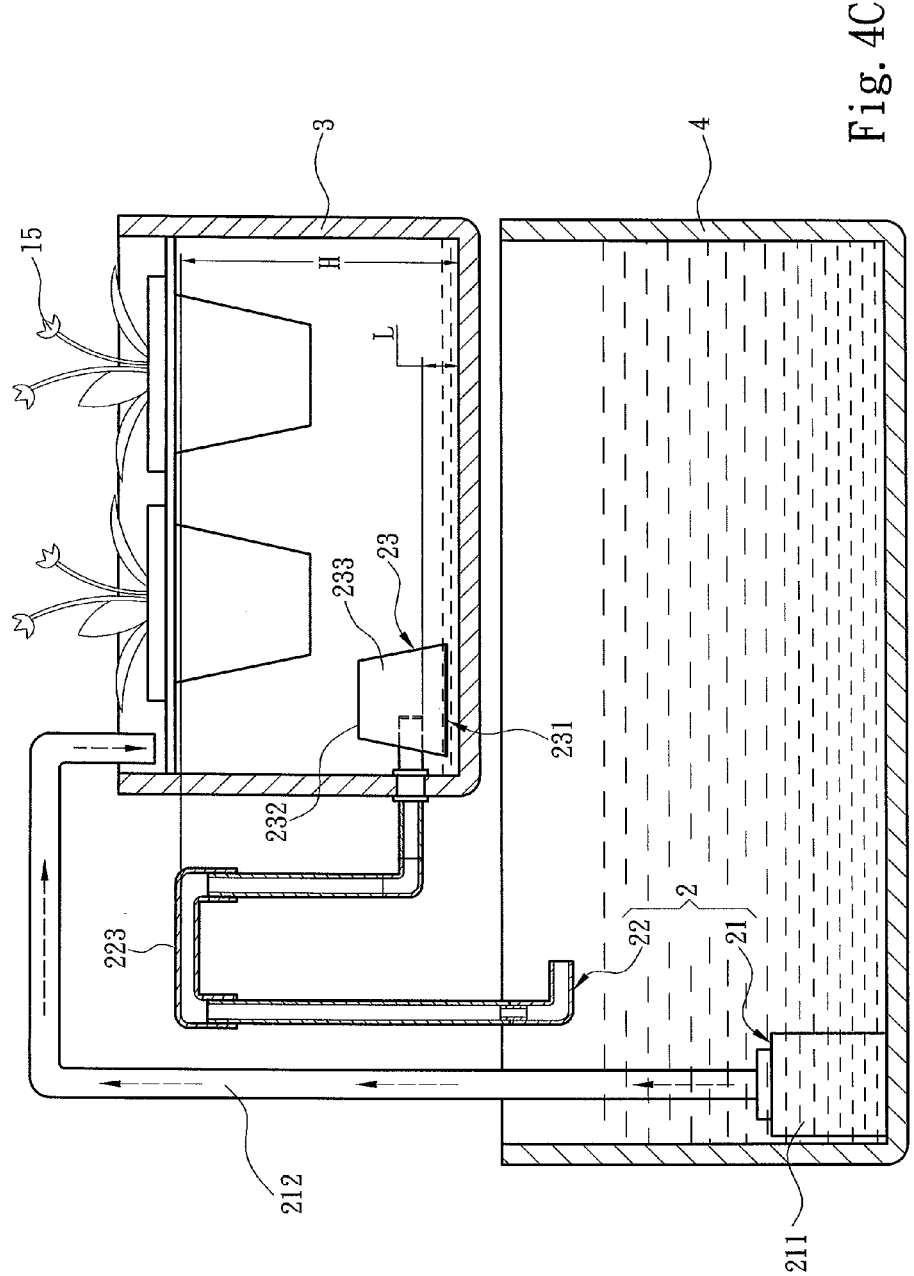
Figure 6:
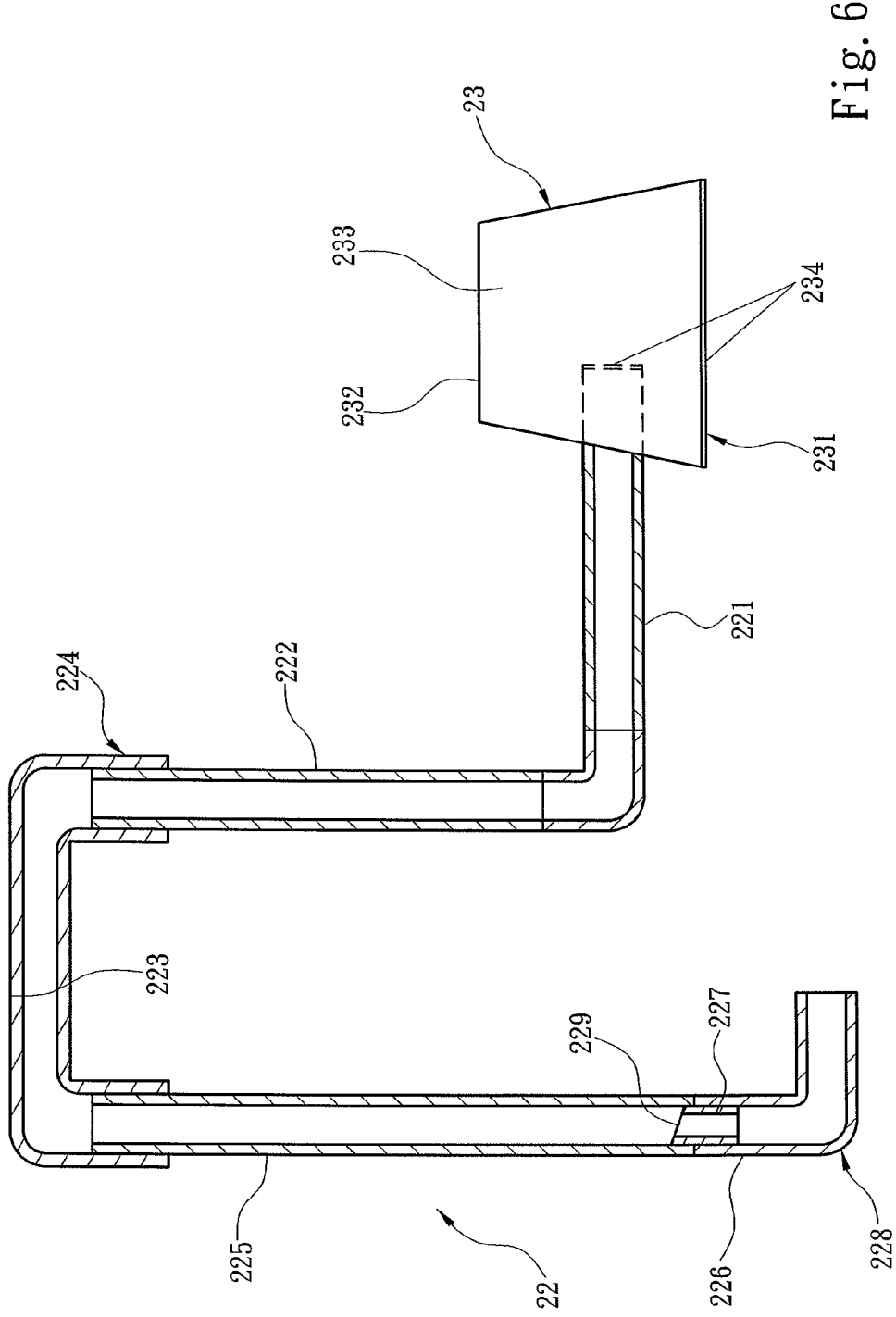
FIG. 6 is a schematic view of yet another structure of the external siphon equipment of the invention.

Please refer to FIGS. 4A through 4C for the external cultivation liquid siphon 2 of the invention in use for circulation of the cultivation liquid. The liquid pumping device 211 draws the cultivation liquid from the cultivation liquid storage tank 4 and injects to the plant cultivation pot 3 via the liquid delivery pipe 212. The cultivation liquid accumulates gradually until reaching the upper liquid level H as shown in FIG. 4A so that a plurality of plants 15 cultivated in the plant cultivation pot 3 can absorb the cultivation liquid. Meanwhile, the horizontal section 223 of the inverse U-shaped tube 224 also is filled with the cultivation liquid due to rising of the liquid level. Because of tubular diameter differences among the second connection tube, 225, the intermediate tube 227 and the liquid discharge tube 226, a siphonage action of filling and flowing the liquid in the tubes takes place; incorporated with the gravity of the cultivation liquid and the atmospheric pressure, the cultivation liquid quickly flows through the liquid input tube 221, the first connection tube 222, the inverse U-shaped tube 224, the second connection tube 225, and the intermediate tube 227 and discharged through the liquid discharge tube 226 to the cultivation liquid storage tank 4, and the liquid level drops as shown in FIG. 4B. To facilitate generation of the siphonage action, aside from forming the tubes in different diameters, the liquid discharge tube 226 has a bend section 228 adjacent to a coupling location of the intermediate tube 227, or the intermediate tube 227 can have the coupling section located in the second connection tube 225 and formed at a length smaller than another coupling section of the intermediate tube 227 located in the liquid discharge tube 226; and as shown in FIG. 6, the intermediate tube 227 can also have a siphon ancillary sloped surface 229 formed at an upper end of the coupling section located in the second connection tube 225. Thereby, a liquid column filled the tubes can be generated easier, and when the liquid level drops to a location as shown in FIG. 4B external air can enter via the liquid input tube 221 to break the liquid column and stop the siphonage action.

Please also referring to FIG. 2, in order to ensure that the siphonage action is stopped as desired, the invention also provides a siphon ancillary member 23 on the liquid input tube 221 in the plant cultivation pot 3. The siphon ancillary member 23 has an open end 231 located at the lower liquid level L and a closed end 232 higher than the liquid input tube 221, and an installation space 233 between the closed end 232 and the open end 231. The installation space 233 has a space between the liquid input tube 221 and the closed end 232 to be defined as a siphon air chamber. In the event that liquid delivered amount during injecting of the liquid to the plant cultivation pot 3 and liquid discharged amount at the final stage of the siphonage action are abnormal due to improper control operation that results in balance of liquid amount unable to stop the siphonage action, through the siphon ancillary member 23 as shown in FIG. 4B, when the liquid level reaches proximate to the lower liquid level L and if the siphonage action does not stop, when the liquid level reaches the position substantially at the horizontal position of the open end 231 of the siphon ancillary member 23 as shown in FIG. 4C, the atmospheric pressure difference allows the air to enter to break the liquid column and stop the siphonage action. In addition, the liquid input tube 221 or the open end 231 of the siphon ancillary member 23 can be coupled with an isolation member 234 to prevent external objects or dirt or stones from entering.

As a conclusion, the external cultivation liquid siphon 2 of the invention has the external siphon equipment 22 located outside the plant cultivation pot 3. The tubular sizes of the external siphon equipment 22 can be selected to generate siphonage action more efficiently. In addition, the siphon ancillary member 23 can effectively solve the problem of failing to stop the siphonage action caused by improper liquid delivered amount or control failure of liquid discharged amount at the final stage of siphonage action. Furthermore, the liquid input tube 221 or the open end 231 of the siphon ancillary member 23 can be coupled with the isolation member 234 to block external objects or dirt or stones from entering, thereby external air can enter the siphon air chamber without being hindered to break the liquid column.

While the preferred embodiments of the invention have been set forth for the purpose of disclosure, they are not the limitation of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An external cultivation liquid siphon system, comprising:
   a plant cultivation pot;
   a cultivation liquid storage tank; and
   an external cultivation liquid siphon bridging the plant cultivation pot and the cultivation liquid storage tank to provide reciprocal siphonage action, the external cultivation liquid siphon comprising:
   liquid delivery equipment including a liquid pumping device located in the cultivation liquid storage tank and a liquid delivery pipe bridging the liquid pumping device and the plant cultivation pot; and
   external siphon equipment which defines an upper level in the plant cultivation pot corresponding to a plant cultivating location and a lower level away from the plant cultivating location and is connected to a liquid input tube corresponding to the lower level, the liquid input tube being connected to a first end of an inverse U-shaped tube corresponding to the upper level via a first connection tube, the inverse U-shaped tube including a second end connected to a liquid discharge tube via a second connection tube to deliver cultivation liquid to the cultivation liquid storage tank;
   wherein the liquid discharge tube and the second connection tube are internally bridged by an intermediate tube having an inner diameter smaller than that of the second connection tube and the liquid discharge tube.

2. The external cultivation liquid siphon system of claim 1, wherein the liquid input tube in the plant cultivation pot is coupled with a siphon ancillary member which includes an open end at the lower liquid level and a closed end higher than the liquid input tube, and an installation space between the closed end and the open end, the installation space including a space between the liquid input tube and the closed end to form a siphon air chamber.

3. The external cultivation liquid siphon system of claim 2, wherein the liquid discharge tube includes a bend section adjacent to a coupling location of the intermediate tube.

4. The external cultivation liquid siphon system of claim 2, wherein the first connection tube and the inverse U-shaped tube are formed by bending a same tube.

5. The external cultivation liquid siphon system of claim 2, wherein the liquid input tube, the first connection tube and the inverse U-shaped tube are formed by bending a same tube.

6. The external cultivation liquid siphon system of claim 2, wherein the liquid input tube, the first connection tube, the second connection tube and the inverse U-shaped tube are formed by bending a same tube.

7. The external cultivation liquid siphon system of claim 2, wherein the intermediate tube includes a first coupling section at the second connection tube having a length smaller than a second coupling section at the liquid discharge tube.

8. The external cultivation liquid siphon system of claim 2, wherein the intermediate tube includes a coupling section at the second connection tube that forms a siphon ancillary sloped surface at an upper end thereof.

9. The external cultivation liquid siphon system of claim 2, wherein the liquid input tube is coupled with an isolation member.

10. The external cultivation liquid siphon system of claim 2, wherein the inverse U-shaped tube includes a horizontal section which also can be an arched section.

11. The external cultivation liquid siphon system of claim 2, wherein the open end is coupled with an isolation member.

12. The external cultivation liquid siphon system of claim 1, wherein the liquid discharge tube includes a bend section adjacent to a coupling location of the intermediate tube.

13. The external cultivation liquid siphon system of claim 1, wherein the first connection tube and the inverse U-shaped tube are formed by bending a same tube.

14. The external cultivation liquid siphon system of claim 1, wherein the liquid input tube, the first connection tube and the inverse U-shaped tube are formed by bending a same tube.

15. The external cultivation liquid siphon system of claim 1, wherein the liquid input tube, the first connection tube, the second connection tube and the inverse U-shaped tube are formed by bending a same tube.

16. The external cultivation liquid siphon system of claim 1, wherein the intermediate tube includes a first coupling section at the second connection tube having a length smaller than a second coupling section thereof at the liquid discharge tube.

17. The external cultivation liquid siphon system of claim 1, wherein the intermediate tube includes a coupling section at the second connection tube that forms a siphon ancillary sloped surface at an upper end thereof.

18. The external cultivation liquid siphon system of claim 1, wherein the liquid input tube is coupled with an isolation member.

19. The external cultivation liquid siphon system of claim 1, wherein the inverse U-shaped tube includes a horizontal section which also can be an arched section.

\* \* \* \* \*